Aug. 8, 1967

H. H. CHARLES 3,334,464

DOOR AND METHOD FOR MAKING SAME

Filed Oct. 21, 1965

INVENTOR.
HAROLD H. CHARLES
BY
*Browne, Schuyler, & Beveridge*
ATTORNEYS.

Aug. 8, 1967　　　　　　　H. H. CHARLES　　　　　　　3,334,464
DOOR AND METHOD FOR MAKING SAME
Filed Oct. 21, 1965　　　　　　　　　　　　　　　　6 Sheets-Sheet 2
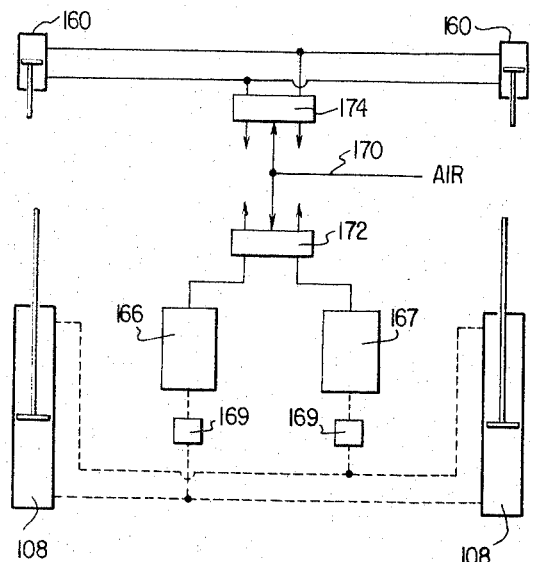
FIG. 10
FIG. 4
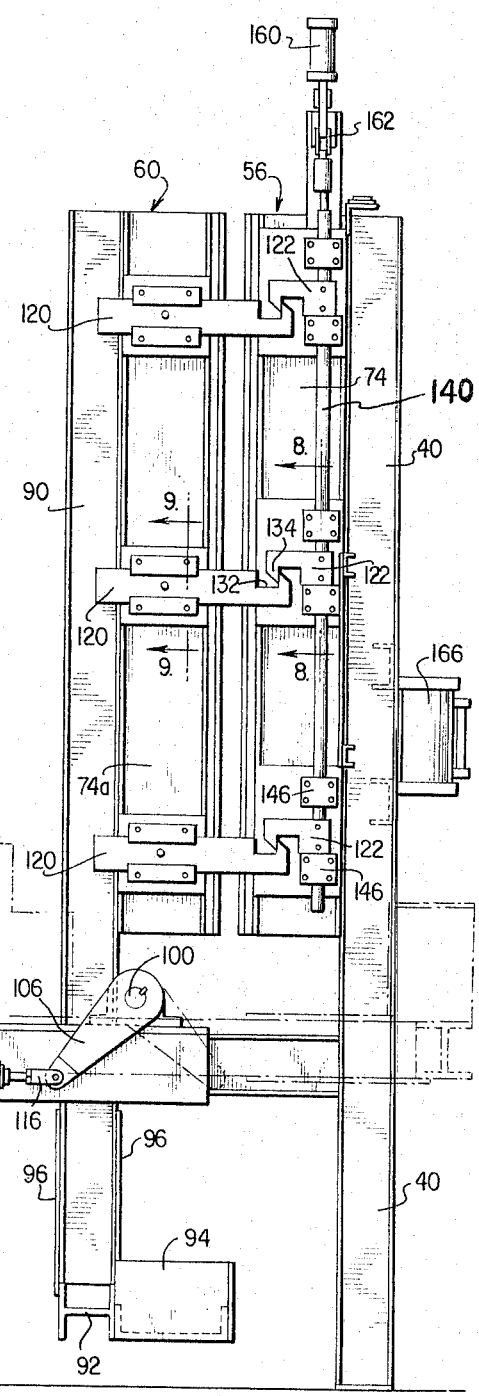
INVENTOR.
HAROLD H. CHARLES
BY Browne, Schuyler, & Beveridge
ATTORNEYS.

Aug. 8, 1967       H. H. CHARLES             3,334,464
              DOOR AND METHOD FOR MAKING SAME
Filed Oct. 21, 1965                          6 Sheets-Sheet 5

INVENTOR.
HAROLD H. CHARLES

BY Browne, Schuyler, & Beveridge

ATTORNEYS.

Aug. 8, 1967   H. H. CHARLES   3,334,464
DOOR AND METHOD FOR MAKING SAME
Filed Oct. 21, 1965

INVENTOR
HAROLD H. CHARLES

BY Browne, Schuyler, & Beveridge
ATTORNEYS

United States Patent Office 3,334,464
Patented Aug. 8, 1967

3,334,464
DOOR AND METHOD FOR MAKING SAME
Harold H. Charles, Atlanta, Ga., assignor to Anaconda Aluminum Company, Louisville, Ky., a corporation of Montana
Filed Oct. 21, 1965, Ser. No. 499,946
12 Claims. (Cl. 52—620)

ABSTRACT OF THE DISCLOSURE

A door comprising two parallel facing sheets, a peripheral frame formed by elongated channels which receive the marginal portions of the facing sheets, and a poured in place foam plastic core. Each channel has a generally U-shaped cross-section including a pair of internal flanges which project obliquely from opposite legs thereof to define recesses which receive the marginal portions of the facing sheets. These internal flanges also define together with the webs of the channels, third recesses which receive right angle keys employed in assemby during fabrication. The plastic core extends throughout the space enclosed by the facing sheets and channels and also into the recesses between the flanges and the marginal portions of the facing sheets.

In making the door, two right angle keys are placed into the opposite ends of one of the side channels and then the top and bottom channels are assembled at right angles to the side channel and in a horizontal plane. The facing sheets are then slide into parallel superimposed position in the recesses of the channels. The remaining side channel is then provided in its opposite ends with two remaining keys whose exposed legs are then inserted into the top and bottom channels with the recesses of the remaining side channel receiving the exposed marginal edges of the facing sheets. The assembly is then moved into a vertical position and a predetermined quantity of molten foam plastic is introduced into the interior of the assembly through one or more pouring holes formed in one of the channels. The plastic is allowed to expand and rise to entirely fill the hollow space in the door.

---

This invention relates to a door having a foam plastic or similar core which is formed in place during fabrication. Also this invention pertains to a method for making the door.

One of the objects of the present invention is to provide a novel door which is lightweight and durable and yet possesses good acoustical qualities.

Another object of the present invention is to provide such a door which, relatively speaking, may be economically manufactured in various designs suitable for either home or institutional use.

A further object of the persent invention is to provide a novel method for making the aforementioned door with increased efficiency and economy suitable for commercial mass production. Included herein is the provision of such a method in which certain elements of the door are employed to advantage during assembly.

Achieving the above objects is a door composed of two parallel facing sheets which form the front and rear sides of the door, a foam plastic core which is poured or formed in place between the facing sheets and a peripheral frame formed by elongate channels which receive the marginal portions of the facing members and core. Four such channels rectangularly oriented form the frame of the door, each channel having a generally U-shaped cross-section including a pair of internal flanges which project obliquely from the opposite side or leg portions of the channel in a direction opposite to the web of the channel. Defined by the opposite channel leg portions and the adjacent internal flanges are a pair of recesses which receive the marginal portions of the facing sheets with the plastic core extending into the space between the facing sheets and the flanges. Filling the entire space enclosed by the facing sheets and channels, the plastic core extends between and engages the inner sides of the internal flanges, which are preferably roughened in order to further enhance the inter-engagement or bond between the core and the channels. As will be subsequently described, the recesses formed by the internal flanges and the opposite sides of the channel further serve to locate and hold the facing members in position during assembly of the door preliminary to the foaming process.

Also formed by the internal flanges in each of the channels is a third recess or compartment situated between the internal flanges and the channel web portion. This third compartment serves to receive right angle keys at each of the corners of the door to assemble the frame channels relative to each other prior to the foaming process.

In making the door according to one embodiment of the invention, the channels and facing members are assembled in a horizontal plane on one of the platens of a press. To effect this assembly, two of the right angle keys mentioned above are placed into the third compartment in the opposite ends of one of the side channels, preferably the hinge stile channel, and then the top and bottom channels are assembled at right angles to the stile channel with the exposed legs of the keys received in the third compartments of the top and bottom channels. Next the opposite facing members are slid into parallel superposed position in the channels with the marginal portions of the facing members received in the opposite recesses in the channels formed by channel leg portions and the internal flanges. To complete this assembly, the other side channel, which wil lform the strike-stile, is provided in its opposite ends with the two remaining right angle keys, and the exposed legs of the keys are then inserted into the top and bottom channels.

In this assembled position, the door elements are secured in place on the platen by suitable jigs. The platen with the assembled door secured thereon is then moved into a vertical position adjacent to and parallel with a vertical stationary platen so as to press or in effect, clamp the door between the two platens in vertical position.

To hold the platen members in operative position on opposite sides of the door assembly against outward movement, a latch mechanism is provided on opposite sides of the platen. After this latch mechanism is actuated to positively lock the platens in their door clamping position, a predetermined quantity of molten foam plastic is introduced into the hollow interior of the door through one or more pouring holes formed in the upper side or strike channel. The plastic is allowed to expand and rise to fill the hollow space in the door and during this foaming process, heat is applied to both facing members by heating elements embedded in the platens.

At the conclusion of the foaming process when the core sets, the latch mechanism is released and the movable platen moved away from the vertical platen to release the newly formed door. Before the foam has risen, plugs are inserted in the pouring holes in the strike channel. Finally, hardware such as hinges, knob and lock set are assembled in preformed cut-out portions of the door.

Other objects and advantages of the present invention will be apparent from the following description together with the attached drawings in which:

FIG. 4 is a side elevational view of a press embodying the present invention employed in making the door of FIG. 1, with certain portions removed and others shown in phantom to indicate the loading and release position of a movable platen included in the press;

FIG. 8 is an enlarged, fragmental, cross-sectional view taken generally along lines 8—8 of FIG. 4;

FIG. 9 is an enlarged, fragmental, cross-sectional view taken generally along lines 9—9 of FIG. 4;

FIG. 10 is a schematic view illustrating a system for operating the press;

Figure 1:
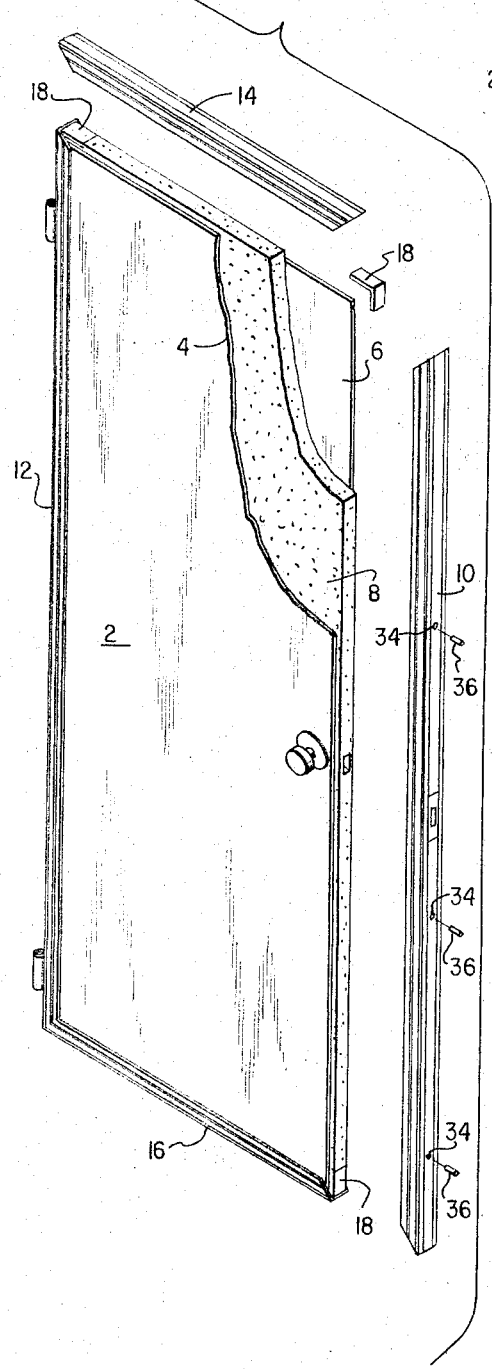
FIG. 1 is an exploded, perspective view of a door embodying the present invention, with certain portions broken away.

Referring now to the drawings in detail, the embodiment 2 of the door of the present invention illustrated in FIG. 1 is basically comprised of two opposite and parallel rectangular facing sheets 4 and 6 forming the opposite sides of the door, a foam plastic core 8 between the facing sheets and a peripheral frame formed by elongate channels 10, 12, 14 and 16 surrounding and receiving the marginal portions of the facing sheets and core. Additionally, the door includes four right angle keys 18 employed in assembling the channels during fabrication as will be described. Facing sheets 4 and 6 are formed from any suitable sheet material, preferably aluminum and for decorative purposes, a thin veneer of cloth, wood, vinyl, etc., may be applied to the external surface of the facing sheets.

Figure 2:
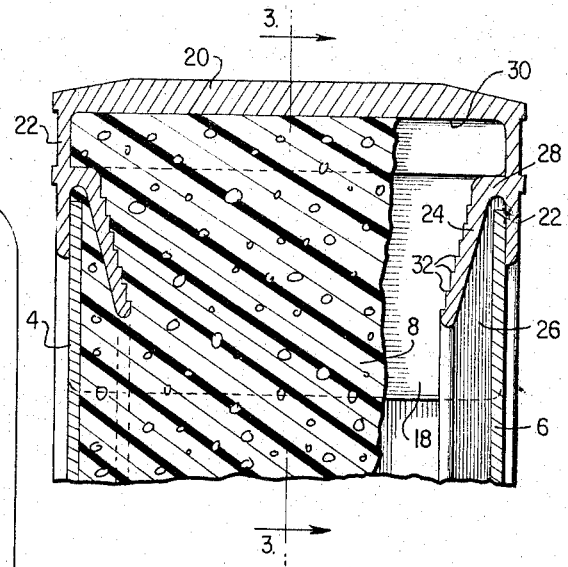
FIG. 2 is an enlarged, transverse cross-sectional view of a top frame portion of the door of FIG. 1.
Figure 3:
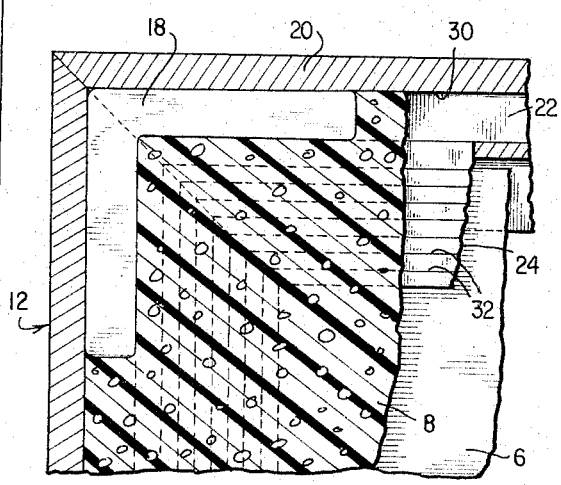
FIG. 3 is an enlarged, fragmental, cross-sectional view taken generally along lines 3—3 of FIG. 2.

As shown in FIG. 1, the frame is comprised of two side channels 10 and 12 and top and bottom channels 14 and 16, the ends of which are formed at 45° to enable the channels to be assembled in rectangular relationship with the ends of the channels in flush abutting engagement. In the preferred embodiment the channels are formed as aluminum extrusions and referring to FIG. 2, each has a generally U-shaped cross-section including a web portion 20 and opposite leg portions 22 projecting perpendicularly from the opposite sides of the web portion. In accordance with one aspect of the invention, each channel is formed with continuous internal flanges 24 projecting obliquely at about 15°, from the internal sides of leg portions 22 and in a direction away from web portion 20. Internal flanges 24 together with channel leg portions 22 form a pair of opposite, continuous internal recesses 26 which receive the marginal portions of facing sheets 4 and 6. Laterally projecting portions 28 of flanges 24 adjacent leg portions 22 also serve to form a third recess or compartment 30 directly below web portions 20 as shown in FIGS. 2 and 3. This third compartment 30 is dimensioned to receive corner keys 18 as illustrated in FIGS. 1 and 3.

Any suitable foam plastic material such as an isocyanate or urethane mixture or cementitious mixture may be employed in making core 8. Completely filling the space enclosed by the frame channels and facing sheets 4 and 6, core 8 extends into recesses 26, between flanges 24 and into recesses 30 to thereby adhesively engage the inner surfaces of the channel web portions 20, corner keys 18 and facing sheets 4 and 6. To enhance the bond between core 8 and channels 10, 12, 14 and 16, the inner sides of flanges 24 are roughened or corrugated longitudinally as shown at 32 in FIGS. 2 and 3. Because of the fact that it has been formed in place against the novel channel configuration, facing sheets 4, 6 and frame channels 10, 12, 14 and 16 are firmly interlocked and held together as a unit solely through the adhesive action of the core. No screws, bolts or other fasteners or secondary adhesives are relied upon.

Conventional hardware such as butt hinges, lock sets and door knobs may be employed in the door. To accommodate such hardware, the channels and facing members are preformed with cut-outs which are plugged during fabrication by inert material such as Teflon (trademark of E. I. du Pont de Nemours and Company for polytetrafluoroethylene). After the core has set and fabrication is complete, the plugs (not shown) are removed from the cutouts which then may be supplied with the hardware.

In making the door, top and bottom channels 14 and 16 are assembled to one of side channels 10 or 12 by inserting two corner keys 18 into compartments 30 in the ends of the channels. Facing sheets 4 and 6 are then inserted in overlying parallel relationship into recesses 26 in the assembled channels after which the other side channel is assembled by means of the two remaining keys 18. This assembly is then placed into a vertical plane, preferably with the side channels horizontally, and a predetermined quantity of a molten foam plastic is introduced through one or more pouring apertures 34 in the uppermost side channel. The proper quantity of plastic having been introduced, it will expand and rise to fully occupy the hollow interior of the door. During this foaming and expansion of the core, the facing sheets 4 and 6 are held against outward movement and heat is applied to the facing sheets in a manner to be described subsequently. The core is then permitted to cure under heat and subsequently upon setting of the core, pouring apertures 34 in the side channel are permanently plugged with suitable material 36 while the cut-outs for the hinges, door knob and lock are unplugged and supplied with the appropriate hardware to thus complete the door.

Referring to FIGS. 4 through 11, there is illustrated press apparatus constructed in accordance with the present invention for fabricating the door in the aforedescribed manner. In the illustrated embodiment, the press has a structural steel support frame including two vertical columns 40 and 42 located generally at the opposite ends of the press and two horizontal beams 44 and 46 welded at their rear ends to lower portions of columns 40 and 42. The opposite or front ends of horizontal beams 44 and 46 are welded on vertical support legs 48 and 50 while a horizontal cross beam 52 is welded between the front ends of beams 44 and 46.

Figure 7:
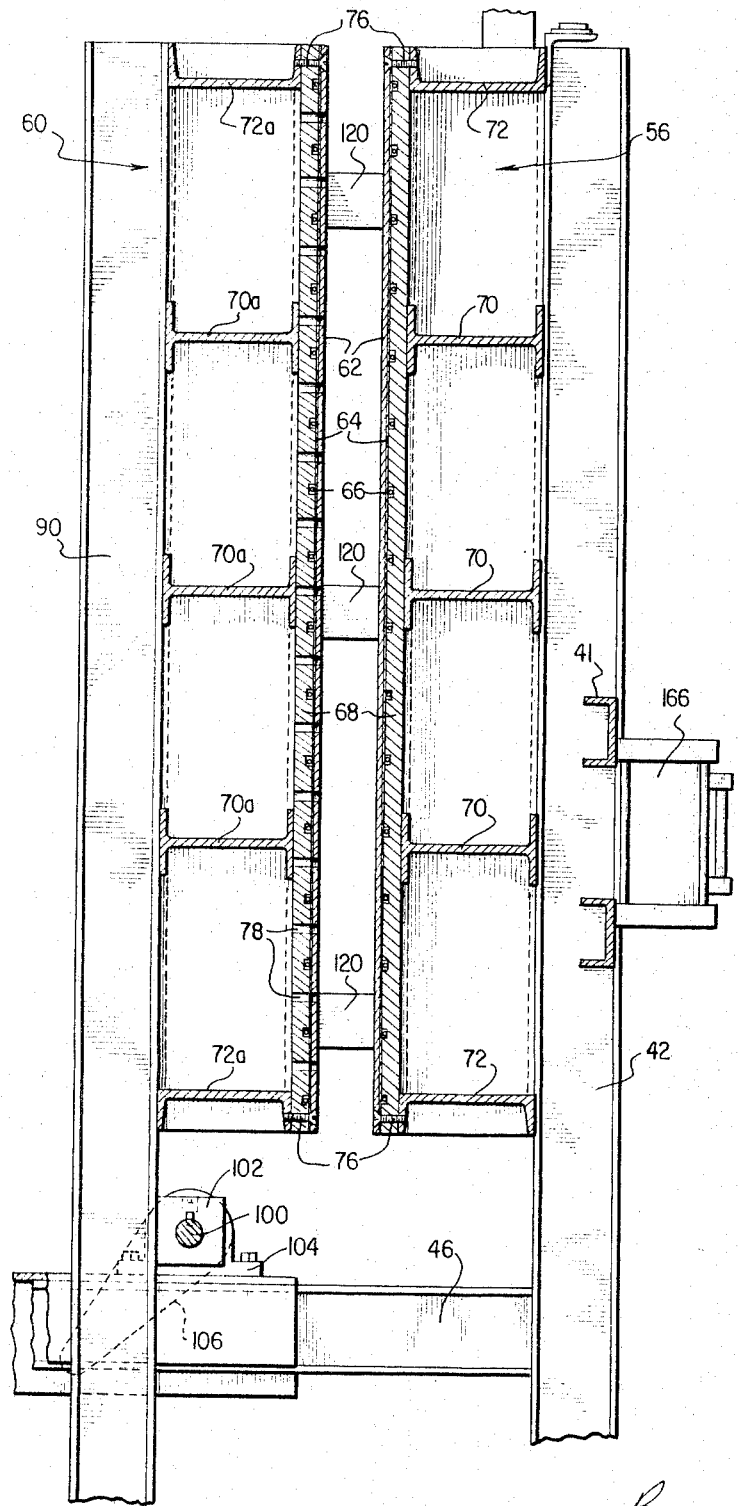
FIG. 7 is an enlarged, cross-sectional view taken generally along lines 7—7 of FIG. 6.

Referring to FIGS. 4 and 7, a vertical stationary platen generally designated 56 is fixed in a vertical plane to frame columns 40 and 42 while a movable platen generally designated 60 is mounted for 90° swinging movement between a horizontal position (shown in phantom in FIG. 4) on horizontal support beams 44, 46, 52 and a vertical position adjacent and parallel to stationary platen 56. As will be subsequently explained, the horizontal position of movable platen 60 is employed for loading and subsequently releasing the door assembly under fabrication while the vertical position is employed for clamping the door assembly against outer movement during the plastic foaming process.

Figure 6:
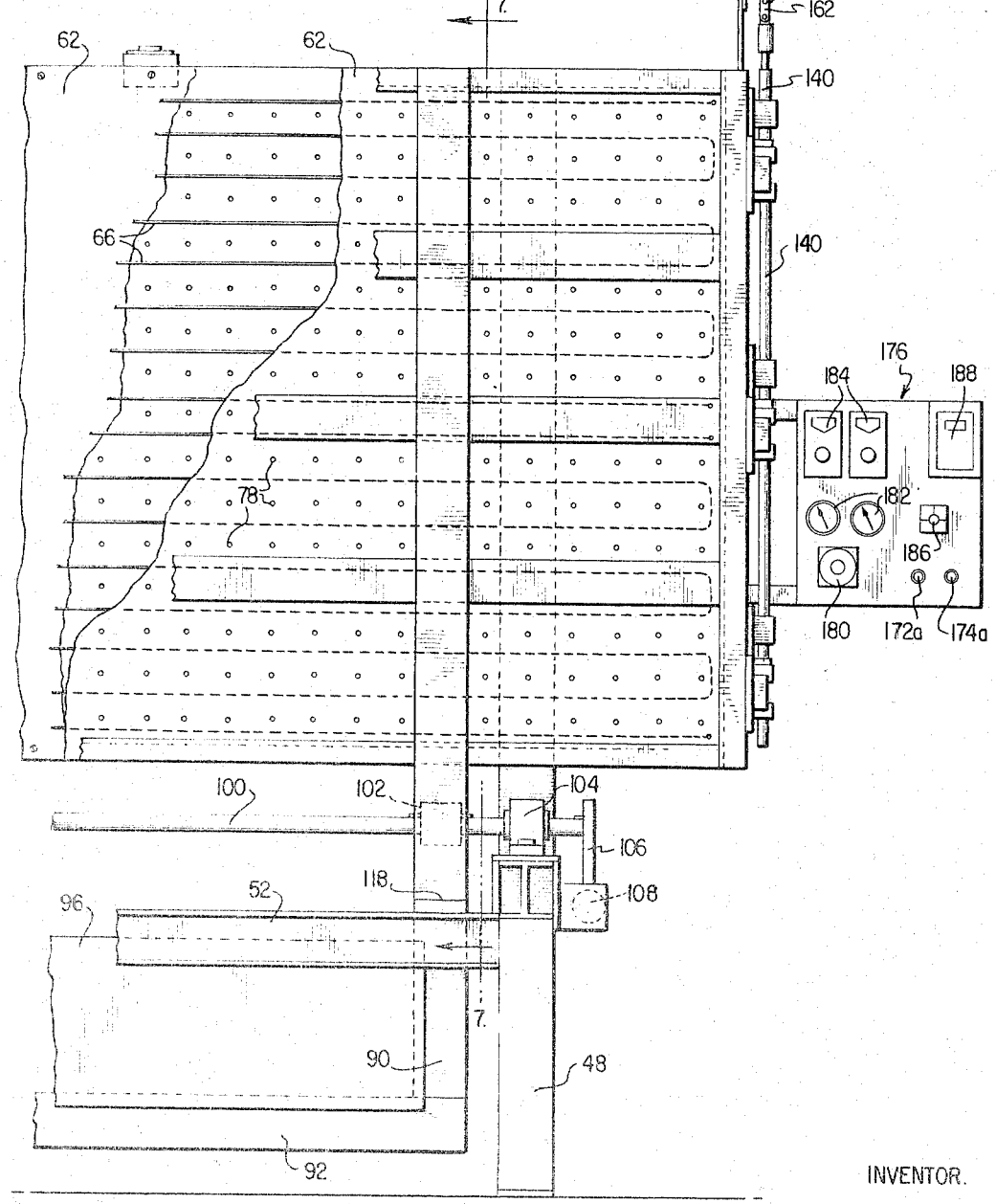
FIG. 6 is a front elevational view of the press with certain portions broken away to show the internal construction of the press platens.

Referring to FIGS. 6 and 7, each platen has a rectangular shape substantially larger than the door to be formed and comprises a door contacting rectangular layer 62 formed from ⅜″ sheet aluminum, an intermediate asbestos layer 64 in which a heating wire grid 66 is embedded, and a rectangular layer 68 formed of ¾″ plywood backing up the asbestos layer on the side opposite aluminum sheet 62. Heating wire grid 66 is arranged in asbestos layer 64 in generally serpentine fashion as shown in FIG. 6 and is of a size to produce a temperature up to about 150° F. under the control of a thermostat.

Firmly anchoring the stationary platen laminations to frame columns 40 and 42 are a plurality of beams which may include, as shown in FIG. 7, three intermediate I beams 70 spaced equally between two channels 72 which extend along the upper and lower sides of the platen. Along the opposite ends of the platen between side channels 72, are welded end channels 74 and the platen laminations are secured to side and end channels 72 and 74 by screws 76.

Movable platen 60 has a laminated construction similar to stationary platen 56 but in addition is provided with a plurality of threaded passages 78 which extend transversely through the laminations from aluminum layer 62 to the rear surface of plywood layer 68 as shown in FIG. 7. These passages 78 receive screws employed to mount jigs 80, 81 and 83 (see FIG. 11) which hold the door assembly in position on movable platen 60 as will be further described. To permit these jigs to be mounted in various positions and thereby accommodate doors of various sizes, jig mounting apertures 78 are provided in a plurality of vertical and horizontal rows (see FIG. 6) with the apertures located between the heating wire portions and spaced 4" on centers for example.

Figure 11:
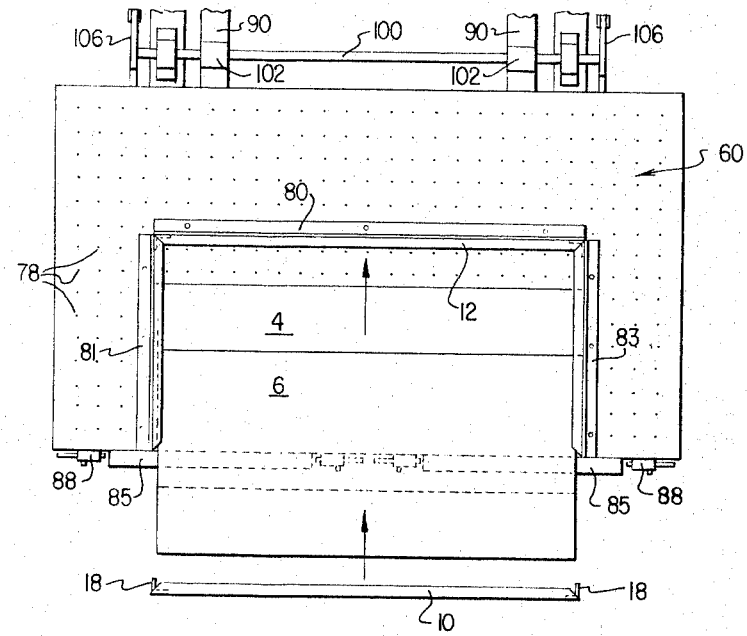
FIG. 11 is a plan view to a reduced scale and with portions broken away, of one of the press platens in loading position and having jigged thereon, a door assembly shown in exploded fashion.
Figure 12:
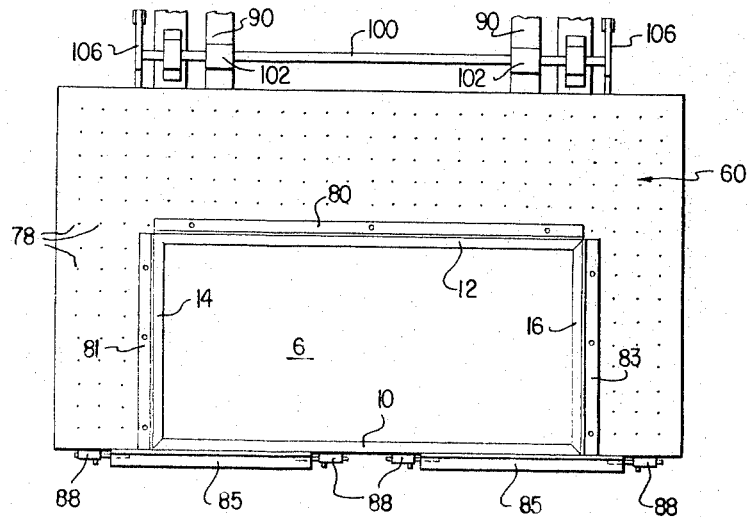
FIG. 12 is a view similar to FIG. 11 but showing the door fully assembled and jigged.
Figure 13:
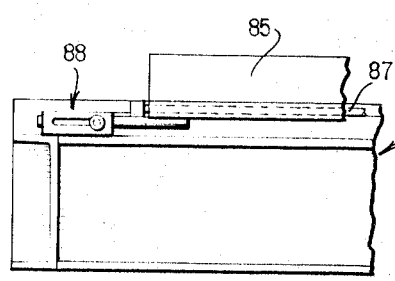
FIG. 13 is an enlarged, front elevational view of the platen as shown in FIG. 12.

Referring to FIGS. 11 to 13, a pair of jigs 85 are swingably mounted to the front side edge of movable platen 60 for movement between an operative position holding the door assembly in place on the movable platen and an inoperative position for loading or releasing the door assembly relative to the movable platen. In the shown embodiment, jigs 85 are provided by right angle members pivoted at 87 for 90° movement. Suitable latches illustrated as 88 are provided for holding jigs 85 in their operative position. Latches 88 are releaseable to permit jigs 85 to be swung from their operative position shown in FIG. 12 to their inoperative position shown in FIG. 11.

Similar to stationary platen 56, the laminations of movable platen 60 are mounted to steel I beams 70a, channels 72a and 74a by screws 76. Beams 70a and channels 72a are in turn welded across a pair of swing arms shown as I beams 90 which are pivotally mounted to horizontal frame beams 44 and 46 for 90° movement between the vertical position shown in FIG. 7 and the horizontal position shown in phantom in FIG. 4. Interconnecting swing arms 90 at their lower ends is a cross beam 92 and welded along the rear side of cross beam 92 is a box-like structural steel enclosure 94 which receives counterweights (not shown) sufficient to balance the movable platen in its upright or vertical position. An additional counterweight compartment 98 (see FIG. 5) is formed by two plates 96 fixed in parallel relation across swing arms 90 and cross beam 92. Compartment 98 receives a fixed counterweight of for example 1500 lbs. of lead while the counterweights in enclosure 94 may be varied according to the particular door assembly being handled.

Figure 5:
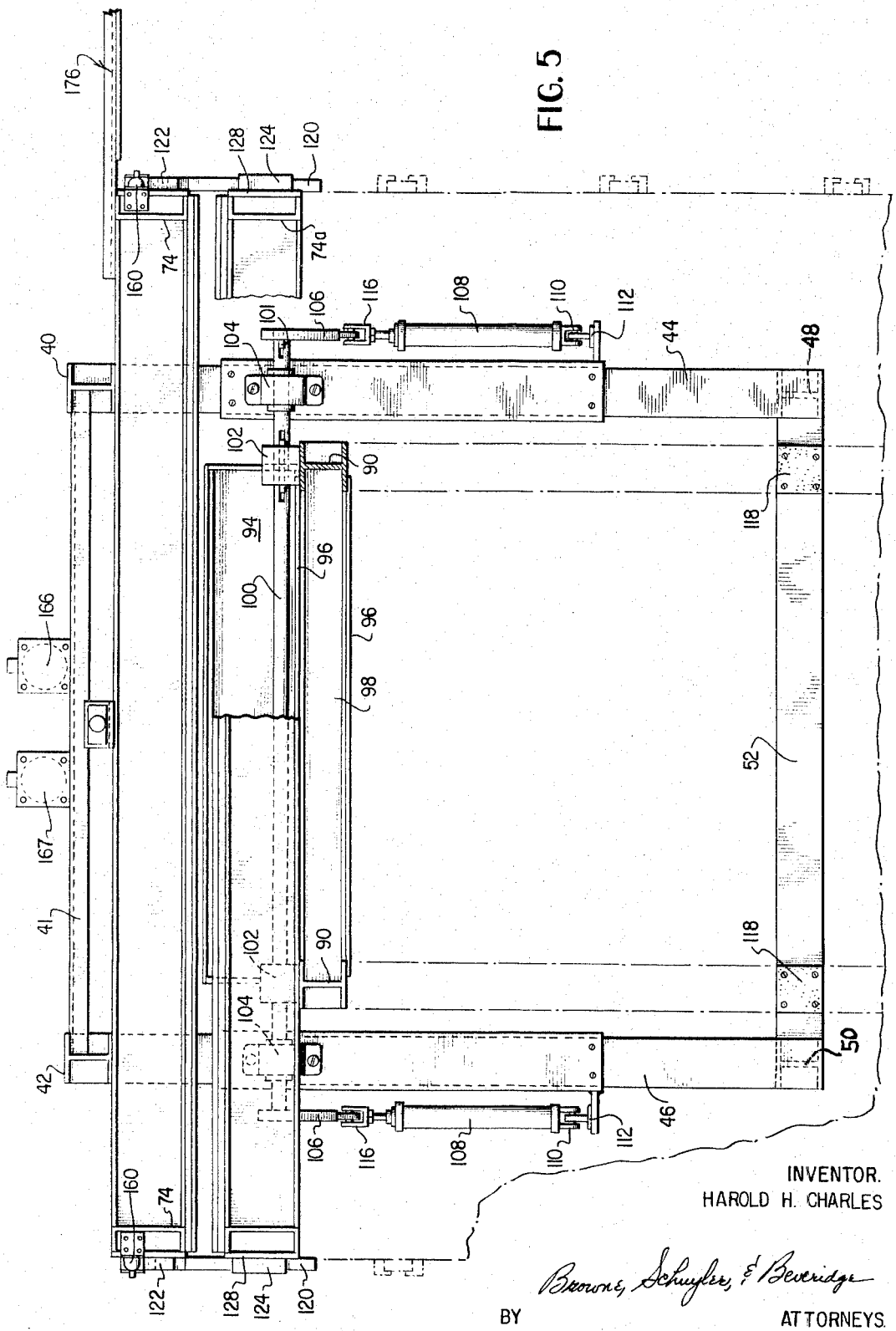
FIG. 5 is a plan view of the press of FIG. 4 with certain portions broken away and again with the loading or release position of the movable platen shown in phantom.

Mounting swing arms 90 for movement to the horizontal frame in the illustrated embodiment is a shaft 100 keyed at its opposite end portions in mounting blocks 102 which are fixed to swing arms 90 just above the elevation of horizontal frame beams 44 and 46. Outwardly of blocks 102, shaft 100 is journalled on horizontal frame beams 44 and 46 by suitable pillow blocks 104 which are screwed to the mounting channel 114. The mounting channel 114 is screwed to beams 44 and 46. This permits the movable platen to be adjusted forward or backward in relation to the fixed platen. Opposite ends 101 of shaft 100 project through pillow blocks 104 and are keyed at their extremities to bell cranks 106 which upon oscillation, rotate the shaft to swing movable platen 60. Cranks 106 are driven by fluid motors 108 mounted along horizontal frame beams 44 and 46 as shown in FIGS. 4 and 5. In the specific form shown, fluid motors 108 are pivoted at 110 to a bracket 112 which in turn is fixed relative to the horizontal frame beam by means of mounting channel 114. Crank 106 is pivotally connected to the drive rod of the fluid motor 108 by a clevis 116.

To absorb the shock of movable platen 60 upon reaching its horizontal position, preferably there are provided bumpers 118 of rubber or the like on appropriate locations on cross frame beam 52 as shown in FIG. 5.

In order to maintain movable platen 60 in its vertical clamping position against outward movement away from stationary platen 56 during the foaming process, a latch mechanism is provided on the opposite ends of the platens. In the illustrated embodiment, this latch mechanism includes three stationary latch bars 120 mounted on each of the opposite ends of movable platen 60 and three movable latch bars 122 mounted on the opposite ends of stationary platen 56 to be respectively cooperable with stationary latch bars 120. Referring to FIGS. 4 and 9, stationary latch bars 120 are received in flanged brackets 124 which are fixed by screws 126 to mounting plates 128 which in turn are welded to end channels 74a of movable platen 60. Dowels 130 received through passages in latch bars 120 and mounting plates 128 serve to secure latch bars 120 in fixed position. Stationary latch bars 120 project across the ends of the stationary platen 56 when the movable platen is in upright position, and the extremities of latch bars 120 are formed with a U-shaped groove 132 dimensioned to receive a mating hooked extremity 134 of an associated movable latch member 122.

Movable latch members 122 on each side of stationary platen 56 are mounted for vertical reciprocable movement by a common actuating rod 140 to which each of movable latch members 122 are secured at equally spaced intervals (see FIG. 4). As shown in FIG. 8, movable latch members 122 are mounted to actuating stem 140 by passages 142 formed in the movable latch member to receive the actuating stem. Each latch bar 122 is fastened on stem 140 by rivets 144 received transversely through the latch bars and actuating stem.

Referring to FIGS. 4 and 8, actuating stems 140 are slideably mounted respectively along the opposite ends of stationary platen 56 by three pairs of brackets 146, each pair straddling one of the movable latch bars. Brackets 146 have a passage lined with a bushing 148 which receives actuating stem 140. Screws 149 fasten brackets 146 to mounting plates 150 which in turn are welded to end channels 74 of the stationary platen.

Vertical reciprocation of actuating stems 140 to engage and disengage the latch mechanism is obtained through a pair of air cylinders 160 suitably mounted at the top of stationary platen 56 above the actuating stems. As shown in FIGS. 4 and 6, air cylinders 160 are connected through appropriate linkages 162 to the top ends of the actuating stems respectively.

Referring to FIG. 10, there is illustrated schematically a system for supplying and exhausting the various fluid motors. Fluid motors 108 which operate movable platen 60 may employ as a motive fluid, oil which is supplied from two oil tanks 166 and 167; the latter being mounted on the rear side of frame columns 40 and 42 to channels 41 fixed across frame columns 40 and 42 as shown in FIG. 5. As illustrated in FIG. 10, oil tanks 166 and 167 are connected by suitable conduits to fluid motors 108 so that each oil tank serves alternately to supply oil to both of the cylinders during one stroke and then receive oil exhausting from the cylinders on the opposite stroke. Flow between oil tanks 166 and 167, and fluid motors 108 is controlled by suitable fuel control valves 169.

Air is employed to force oil from tanks 166, 167 into fluid motors 108. Any suitable air source (not shown) may be provided which feeds into an air inlet line 170 and then to a four-way supply-exhaust control valve 172 which controls the flow of air into the oil tanks. Air inlet line 170 also communicates with a second four-way control valve 174 which controls the supply and exhaust of air to and from air cylinders 160 which operate the latch mechanism. Control valves 172 and 174 are operated by a solenoid (not shown) which may be energized for example through push buttons 172a and 174a located in a control panel 176 mounted at one end of the stationary platen as shown in FIG. 6. Additionally, a timer 180 mounted in the control panel may be employed to indicate the conclusion of the foaming and curing of the plastic core while the door is clamped between the platens. Thermometers 182 for indicating the temperature of the platens as well as thermostats 184 may also be housed in the control panel as are an on-off button 186 and safety switch 188.

A typical operation will now be described. Assuming that movable platen 60 is in the horizontal position, and referring to FIG. 11, hinge stile channel 12 is placed on the aluminum face 62 of the movable platen to extend longitudinally generally at the center of the movable platen. This position of the hinge stile channel is determined by jigs 80 which are secured in the movable platen by screws received in platen passages 78. Two corner keys 18 are then inserted into the opposite ends of hinge stile channel 12 and then top and bottom channels 14 and 16 are assembled to the hinge stile channel by means of the keys 18 which ensure an accurate right angle connection between the channels. Jigs 81 and 83 are then secured in place on the movable platen against channels 14 and 16 after which facing sheets 4 and 6 are inserted in recesses 26 of channels 12, 14 and 16 so as to lie in overlying parallel relationship as illustrated in FIG. 11. Strike-stile 10 is then supplied with two corner keys 18 which are inserted into the exposed ends of top and bottom channels 14 and 16 to thereby place the strike-stile channel 10 in proper position with facing sheets 4 and 6 received in recesses 26 of strike-stile channel 10. Movable jigs 85 are then pivoted from inoperative positions to engage strike-stile channel 10 after which latches 88 are extended to maintain channel 10 in the proper assembled position as illustrated in FIG. 12.

Having assembled and secured the facing sheets and channels on movable platen 60, fluid motors 108 are then actuated to swing platen 60 into vertical position to clamp the door assembly between the platens. Air motors 160 are then actuated to cause the latch actuating stems 140 to descend to engage latch bars 120 and 122 as shown in FIG. 4 to lock the platens in clamping position.

A suitable mixing head (not shown) containing a suitable foam plastic is next moved (such as on an overhead trolley not shown) into position above the channel 10 at the top of the platens. Inlet lines leading from the mixing head are placed into registry with one or more pouring apertures 34 in channel 10 and a predetermined quantity of molten plastic is introduced into the interior of the door. The molten plastic is permitted to foam and expand for a predetermined period of time (approximately five minutes in the average case) sufficient to cause the plastic to fully occupy the interior door space in the manner described above. During expansion of the plastic foam, heat is applied through heating wire grid 66 in the platens.

After the plastic foam has filled the interior of the door, it is permitted to cure for about ten minutes during which the platens are maintained at a temperature between 120°–140°. Subsequently air cylinders 160 are actuated to disengage latch bars 120 and 122 after which fluid motors 108 are actuated to swing movable platen 160 back to the horizontal position. Jigs 80, 81, 83 and 85 are moved to release the door which is then removed from the movable platen.

Modifications and adaptations of the present invention readily apparent from the foregoing description and associated drawings, although not specifically mentioned herein, will nevertheless be included within the scope of the present invention as indicated in the appended claims.

What is claimed is:

1. A channel adapted to form the edge portions of a door or the like including opposite facing members and a foamed in place plastic-like core between the facing members, the channel comprising an elongated integral metallic body including a web portion and opposite leg portions projecting in the same direction from the opposite sides of the web portion, and two elongated flanges projecting inwardly at an oblique angle from the internal sides of said leg portions in a direction generally opposite said web portion, said flanges and said leg portions thereby forming recesses dimensioned to receive marginal portions of the facing members with the facing members engaging the internal sides of said leg portions and with portions of the core located between the marginal portions of the facing members and the flanges, said flanges projecting linearly from said leg portions and sufficiently beyond longitudinal edges of said leg portions to provide a guide means for inserting the opposite facing members of the door between the flanges and the leg portions during fabrication, and surface projections formed on the sides of the flanges opposite said leg portions to increase interengagement between the channel and the core.

2. The channel defined in claim 1 wherein said flanges project at an angle of approximately 15° relative to said leg portions.

3. The channel defined in claim 1 wherein the opposite ends of the channels including said web, leg and flange portions extend at 45° so as to be connectible to a similar channel at right angles thereto, and wherein said flanges form together with said web portion a third recess dimensioned to receive one of the legs of a right angle member employed to connect the channel at right angles to a similar channel.

4. A door comprising a peripheral frame including elongated rigid channels each having a web portion and opposite leg portions projecting in the same direction from opposite sides of the web portion, said channels each further having a pair of internal flanges projecting inwardly from said leg portions at an oblique angle and in a direction generally opposite to said web portion to define recesses between the flanges and the adjacent leg portion, opposite and generally parallel facing members forming the opposite sides of the door with marginal portions of the facing members received in said recesses, and a foamed in place plastic core located between the facing members and within the confines of the channels, said foamed in place plastic core having portions located in said recesses between said facing members and said flanges and in bonding engagement with said facing members and flanges whereby said core additionally serves to bond the channels and facing members together into an integral unit.

5. The door defined in claim 4 wherein said flanges project beyond longitudinal edges of said leg portions and wherein said flanges have surface projections inter-engaged with the foam plastic core.

6. The door defined in claim 5 wherein said channels including said web portions, said leg portions and said flanges are integral aluminum extrusions.

7. The door defined in claim 6 wherein said channels are disposed in rectangular fashion and said facing members are rectangular to thus define a rectangular door, and wherein there is further included right angle corner members interconnecting adjacent channels at each of the corners of the door while being in bonding engagement with said core.

8. A door assembly comprising a generally rectangular frame formed by opposite top and bottom channels and opposite side rigid channels extending between said top and bottom channels, each of said channels having a generally U-shaped cross-section including a web portion and opposite leg portions projecting therefrom and a pair of opposite internal flanges projecting obliquely from the leg portions to form recesses between the leg portions and the flanges, a pair of generally rectangular facing members having their marginal edge portions received in said recesses to thereby lie in parallel and overlying relationship and form the opposite sides of the door, said flanges together with the associated web portions defining a third recess in each channel and four right angle members having their legs received in the third recesses of adjacent channels to interconnect adjacent channels at the four corners of the door assembly, and a poured in place plastic-like core extending throughout the space enclosed by the channels and facing members and into substantially continuous engagement with the right angle members, the internal surfaces of the facing members and web portions and also in the said recesses into engagement with the surface of the facing members and flanges located in said recesses.

9. The method of making a rectangular door from planar facing members and U-shaped channels including top and bottom channels and two opposite side channels, said channels each including a web portion, two leg portions projecting from opposite sides of the web portion and two opposite internal flanges projecting obliquely from the leg portions to define two internal recesses between the flanges and the leg portions and a third internal recess between the web portion and the flanges; the steps comprising inserting two legs of two right angle key members respectively into the third recess at the opposite ends of one of the side channels, inserting the other legs of said two key members respectively into the third recesses in the top and bottom channels so that the top and bottom channels extend at right angles to said one side channel, inserting marginal edge portions of the facing sheets into said two recesses in said one side channel and top and bottom channels so that the facing members lie in overlying parallel relationship within the confines of said one side channel and said top and bottom channels, inserting two legs of third and fourth right angle key members respectively into the third recesses in the other side channel, assembling the other side channel by inserting the other legs of said third and fourth key members respectively into the third recesses of said top and bottom channels and with the first and second recesses of said other side channel receiving the adjacent marginal edges of said facing members, and then positioning the assembled channels and facing members in a vertical plane and introducing a predetermined quantity of foam plastic into the space enclosed by the channels and the facing members and causing said foam plastic to rise to completely fill the space enclosed by the channels and the facing members and to bond the channels, facing members and key members together into a unit.

10. A panel for use in making a door and other structural members, comprising in combination; a rectangular peripheral frame including a pair of opposite side channels and a pair of opposite end channels, the opposite ends of the channels being mitered and in flush engagement with the ends of the adjacent channel, each channel having a web portion and opposite leg portions projecting in the same direction from opposite sides of the web portion, said channels each further having a pair of internal flanges projecting inwardly from said leg portions at an oblique angle and in a direction generally opposite to said web portion to define two recesses between the flanges and the adjacent leg portions, opposite and generally parallel facing members forming opposite sides of the panel with marginal portions of the facing members received in said recesses against the internal surfaces of said leg portions, said flanges together with the associated web portions defining a third recess in each of the channels, four right angle members each having their legs received in the third recesses of adjacent channels to interconnect adjacent channels at the four corners of the panel, and a poured in place plastic-like core extending throughout the space enclosed by the channels and the facing members including the three recesses formed by the flanges with the web and leg portions of the channels, said core being in substantially full and continuous bonding engagement with the internal surfaces of the facing members and channels, including the web and leg portions and opposite sides of the flanges.

11. The panel defined in claim 10 wherein said flanges project linearly from the leg portions sufficiently beyond the longitudinal edges of the leg portions to provide guide means facilitating placement of the facing members in the recesses between the flanges and the leg portions during fabrication.

12. The panel defined in claim 11 wherein said flanges have integral projections formed on their surfaces opposite the leg portions for increasing interengagement with the core.

References Cited

UNITED STATES PATENTS 2,824,630 2/1958 Tolman _____ 52—620
2,989,156 6/1961 Brooks et al. _____ 52—620

FOREIGN PATENTS 1,304,064 8/1962 France.
963,203 7/1964 Great Britain.

DAVID J. WILLIAMOWSKY, *Primary Examiner.*

KENNETH DOWNEY, *Examiner.*